July 19, 1955  R. B. SCHREIBER  2,713,467
SHOCK ABSORBER FOR FALLING OBJECT
Filed March 6, 1950  3 Sheets-Sheet 1
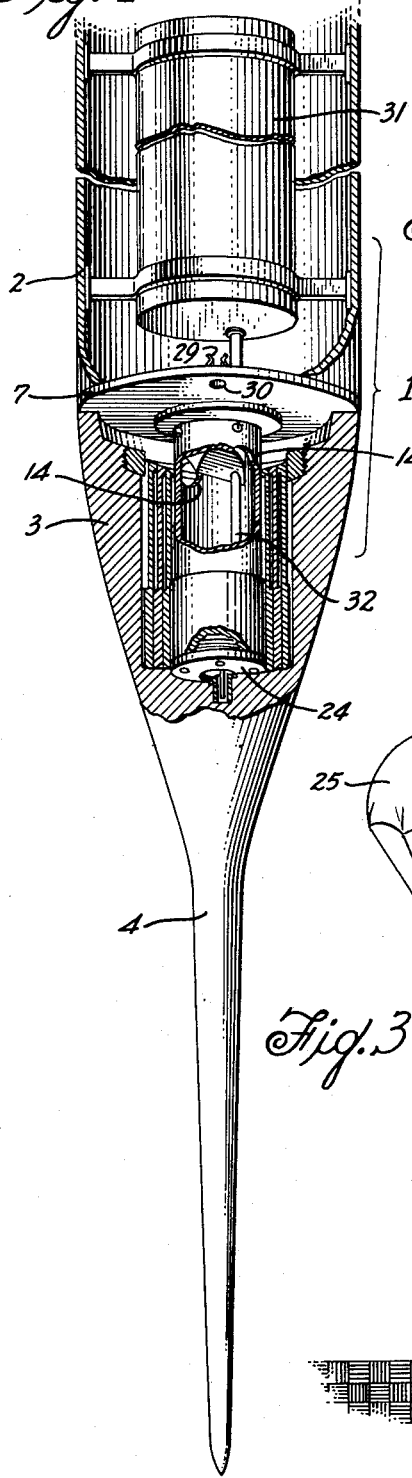
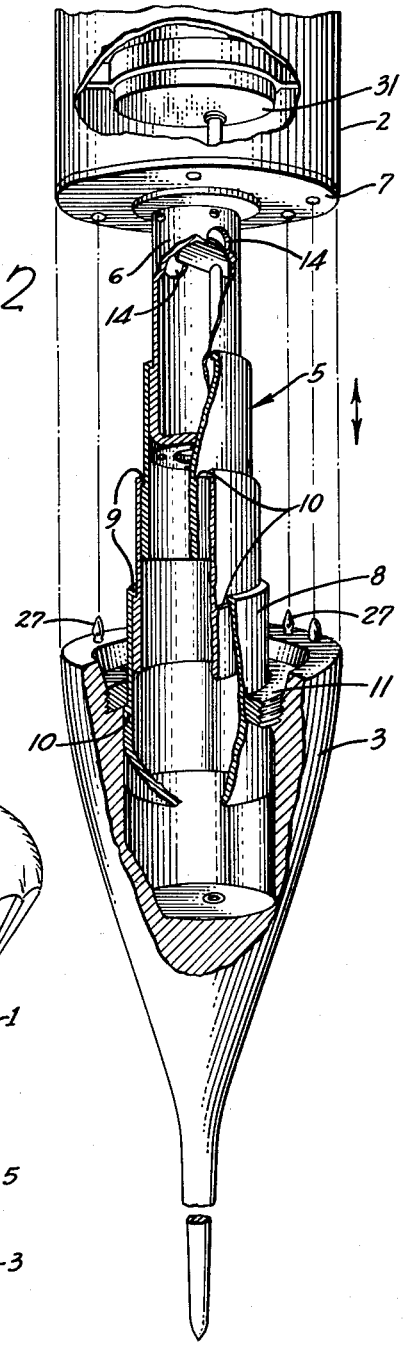
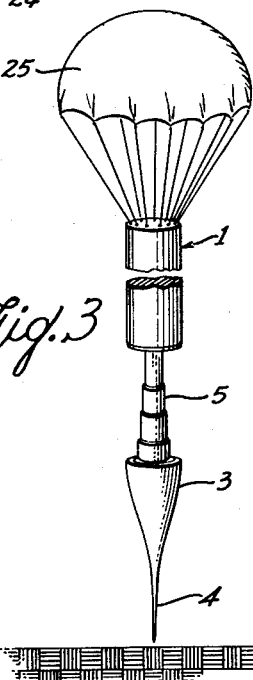
INVENTOR:
RALPH B. SCHREIBER
BY
HIS PATENT ATTORNEY

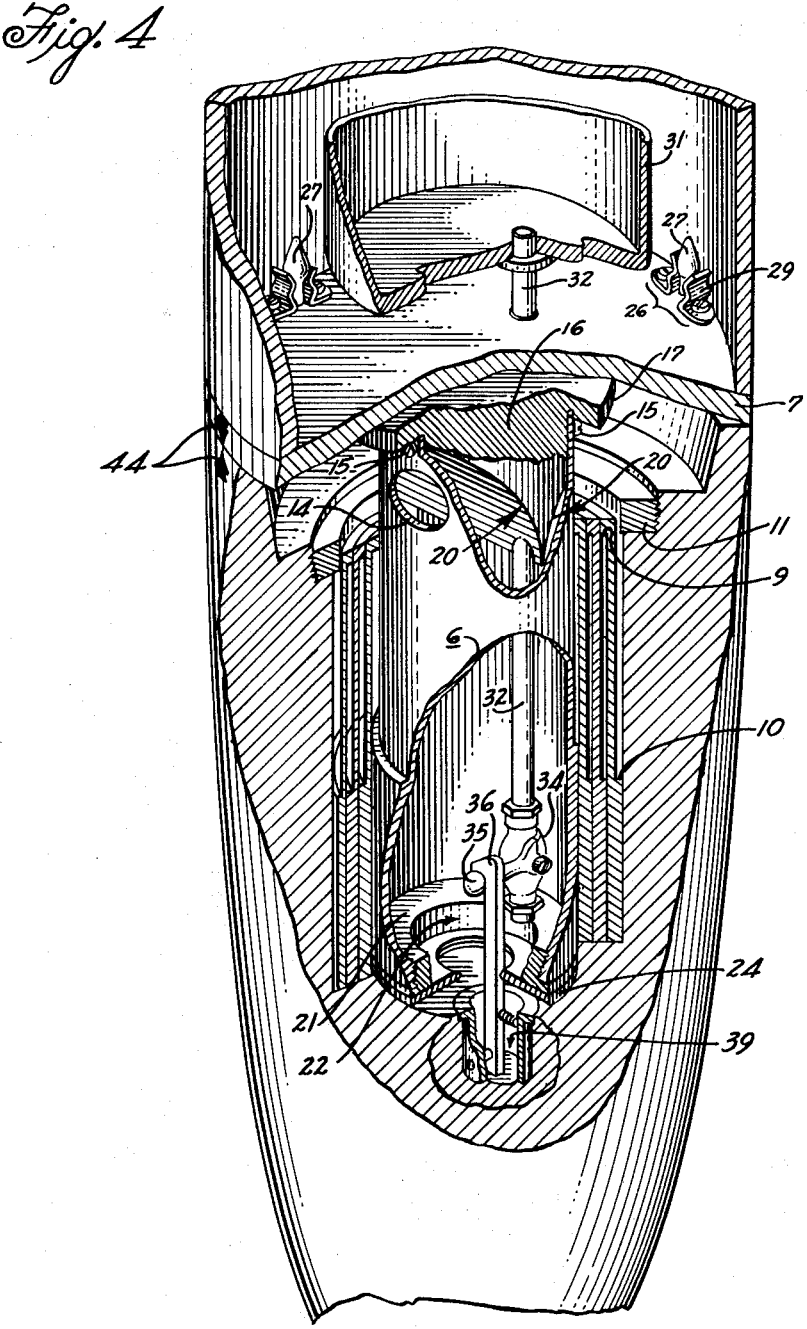

July 19, 1955  R. B. SCHREIBER  2,713,467
SHOCK ABSORBER FOR FALLING OBJECT
Filed March 6, 1950  3 Sheets-Sheet 3

INVENTOR:
RALPH B. SCHREIBER
BY Herbert E. Metcalf
HIS PATENT ATTORNEY

United States Patent Office 2,713,467
Patented July 19, 1955

2,713,467

SHOCK ABSORBER FOR FALLING OBJECT

Ralph B. Schreiber, Los Angeles, Calif., assignor to Northrop Aircraft, Inc., Hawthorne, Calif., a corporation of California Application March 6, 1950, Serial No. 147,864

7 Claims. (Cl. 244—138)

This invention relates to shock absorbers, and more particularly, to a means of absorbing the impact shock of a descending body upon striking the ground.

With many objects designed to travel in the air and then be returned or dropped to the ground, it is desirable or necessary to prevent destruction of the object and its contents for re-use. An example of such a body is the nose of a rocket carrying flight records. The maximum permissible deceleration of the falling body upon impact with the ground is first determined, and then means are devised to limit the descent velocity to a value in accordance with the desired deceleration.

Parachutes are a well known means of regulating the descent velocity of a falling object. A parachute, however, forms a relatively bulky package, posing a problem of space for carrying this packed volume prior to its use. The parachute weight must also be considered, of course.

It is an object of the present invention to provide means enabling increased descent velocities for recoverable dropped objects, thus making possible a smaller parachute, while at the same time restricting the ground impact deceleration to the original maximum permissible value.

Briefly, this invention comprises a sharp, slender spear attached to the nose of the droppable object to allow ground penetration, and a collapsible shock strut filled with liquid and fitted with an orifice, this strut mounted immediately behind the nose spear. The spear and the strut can each be used independently, however.

My invention can be more clearly understood by reference to the accompanying drawings, shown by way of illustration and not limitation, wherein:

Figure 1 is a perspective view of a nose spear and a telescoping shock strut assembly attached to the nose of a droppable object, showing the strut collapsed, and a fluid reservoir installed in the nose.

Figure 2 is a perspective view of the shock absorber assembly shown with strut extended.

Figure 3 is a perspective view showing the dropping object with an open parachute causing the object to descend nose first.

Figure 4 is a perspective view, on a larger scale, showing a strut filling device and shock absorbing means provided in the device of Figures 1 and 2.

Figure 5:
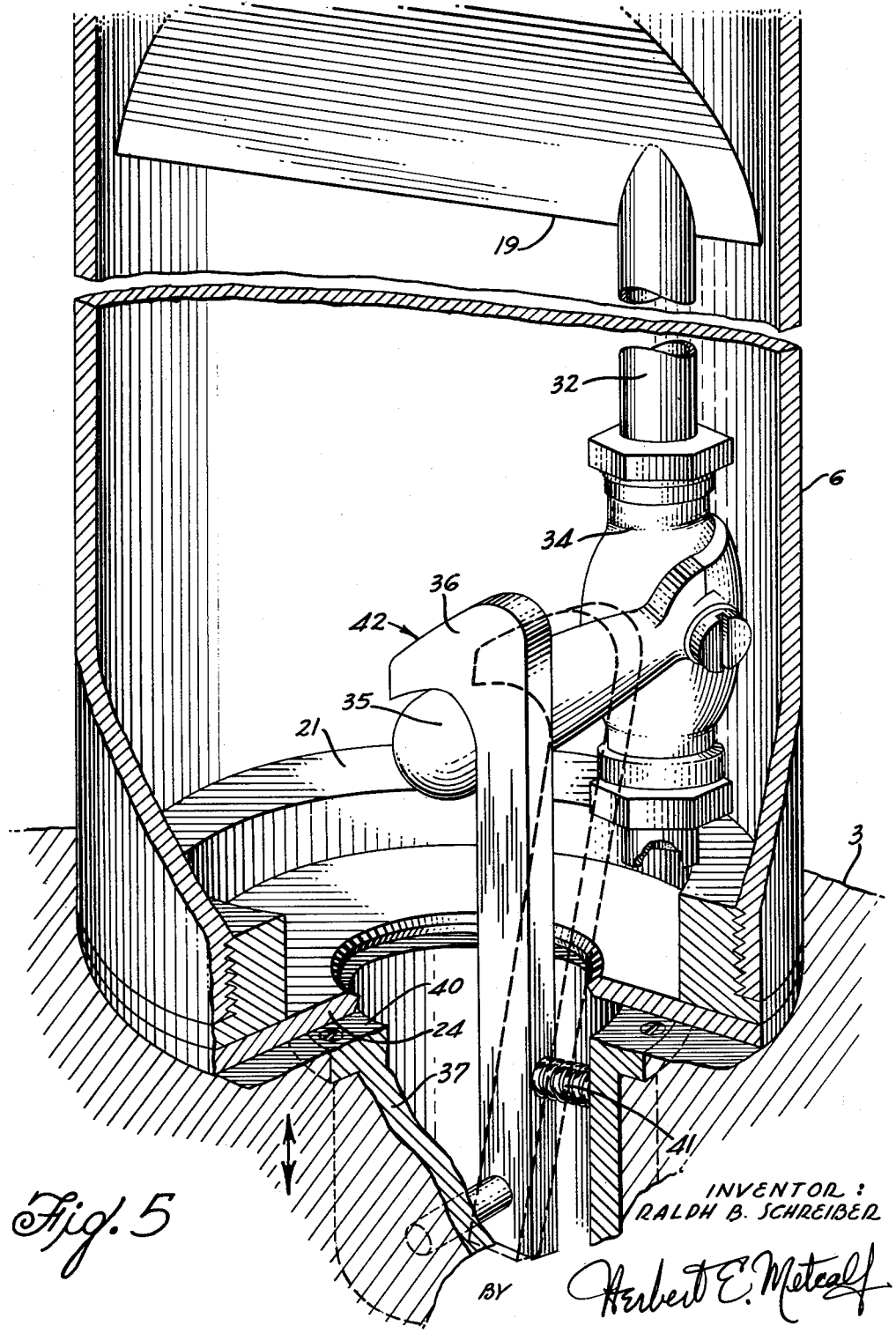
Figure 5 is an enlarged cut-away view showing details of the valve opening hook in Figure 4.

Referring first to Figure 1, an airborne object 1 having a body 2 and a nose section 3 is provided with a forwardly pointed spear 4 fashioned as an extension of the streamlined nose section 3. Assuming for the moment that the nose is solidly attached to the body 2, it can be seen that if the airborne object 1 strikes the earth nose first, the deceleration, in units of distance per time squared, to a stop will be less than if no spear were provided, due to the lengthening of the deceleration time period afforded by the resulting penetration into the earth.

From tests, the best spear shapes and sizes may be determined which will allow the highest possible descent velocity for a given maximum deceleration value. It is thus seen that the nose spear 4 is an effective, simple shock absorber.

As shown in Figure 2, the nose section 3 is not attached securely to the body 2, but is separable to an extent provided by a telescoping strut assembly 5. This assembly comprises a series of tubular barrels, the central tube 6 being fixed to a bulkhead 7 at the forward end of the body 2, and the outer tube 8 being held in the rear of the nose section 3. Each tube, except the central tube 6, carries an inturning flange 9 at its rear end, and all tubes have an outwardly projecting shoulder 10 near their forward ends. The outer tube 8 is slidably held in the nose section 3 by a threaded collar 11 bearing against the rear side of the tube shoulder 10 when the outer tube 8 is extended. The tubes are substantially of equal lengths, with the exception of the central tube 6, thus providing maximum elongation of the assembly with a compact collapsed arrangement.

The central tube 6 contains two opposite escape holes 14 in its walls near the aft end. To the rear of these relatively large holes 14, the central tube 6 is fastened by screws 15 (Figure 4) to a wedge deflector 16 fitting within the tube and carrying a mounting flange 17 whereby the shock strut assembly is secured to the bulkhead 7. The forwardly pointing deflector 16 carries an edge 19 extending across the full inside diameter of the tube, and concave side surfaces 20 slope outwardly in the direction of the escape holes 14. The central tube 6 is somewhat longer than the others, so that the escape holes 14 will not be covered when the strut is contracted.

At the forward end, the central tube 6 contains a threaded plug 21 having an open central passage 22, and an orifice plate 24 is attached to the outer side of the plug 21, the size of the orifice being readily altered by the interchangement of other plates. Thus, if the extended strut is filled with fluid upon impact with the ground, the strut will be collapsed only as fast as the contained fluid is pushed upwardly through the orifice plate 24 and turned 90° by the deflector 16 to finally be forced through the escape holes 14, and deceleration is therefore reduced.

During the first portion of the object's flight, the nose section 3 is retained in a position as shown in Figure 1, relative to the body, thus presenting a smoothly streamlined outline. For the last portion, i. e., descent to the ground, the nose section is extended and the strut is filled with fluid as will next be described.

The specific apparatus as herein described is intended for use in conjunction with a small parachute 25 (Figure 3) which will be packed in the object 1 and opened at a predetermined time to break the fall of the object. Before opening of the parachute, the nose section 3 is held against the body 2 by means capable of disengagement when a sharp separation force is applied, such as a spring type fastener 26, three of which are provided, as shown in Figure 4. A stud 27 of the fastener is fastened to the rear rim of the nose section 3, and a mating socket 29 is mounted on the rear side of the bulkhead 7, where it is reached through a bulkhead aperture 30. The opening shock of the parachute 25 jars loose the fasteners 26, whereupon the tubes of the shock strut assembly 5 extend full length and the object drifts down with the nose spear 4 in a vertical position.

Shock strut fluid, which may be water, for example, is carried in a reservoir 31 fitted in the body 2 of the object 1 (Figure 1). A supply tube 32 leads from the reservoir 31 through the deflector 16 along one side of the central tube 6, and ends adjacent the threaded plug 21 to one side of the plug passage 22, as shown in Figure 4. The supply tube 32 preferably passes through the edge 19 of the deflector near the side of the central tube 6 so as to remain out of the main path of the fluid during its ejection through the escape holes 14 and its travel through the central tube 6.

At the forward end of the supply tube 32, a shut-off valve 34 is provided to retain the shock strut fluid in the reservoir 31 until such time as the nose section 3 is extended from the body 2, thus preventing fluid leakage from the central tube 6 during the portion of flight prior to opening of the parachute. The shut-off valve 34 carries an operating lever 35 extending over the orifice in the orifice plate 24, the valve being closed when the lever 35 is substantially crosswise of the assembly, and open when the lever is rotated toward the front of the nose section 3 through an angle less than 90°.

The valve lever 35 is operated by a hook 36 engaging the lever on its rear side and extending through the orifice from the rear side of the hollowed out nose section 3. As further shown in Figure 5, the hook 36 is pivotally supported in a casing 37 which is inserted in a bore 39 in the nose section 3 and held in place by a flush retainer ring 40. A compression spring 41 elastically forces the hook 36 to its engaging position, and a beveled edge 42 on the head of the hook allows the hook to slide over the valve lever 35 when the nose section 3 is brought into position adjacent to the body 2. Position marks 44 on the nose section and body indicate the proper fastening position so that the hook 36 is correctly aligned relative to the valve lever 35.

It is to be understood that the shock strut filling means disclosed in this specific embodiment may be altered as desired, within the scope of the appended claims, without departing from the essence of the invention.

It is now evident that the shut-off valve 34 can be manually closed, the strut assembly 5 secured to the deflector 16 by screws 15, and the nose section 3 latched in place on the body 2 so that the hook 36 is then automatically engaged back of the valve lever 35. When the parachute 25 is opened in flight, the stud fasteners 26 will release the nose section 3, and the hook 36, being attached in the nose, will rotate the valve lever 35 to the open position upon extension of the strut assembly 5, and then slide past the end of the valve lever 35. Then, during the parachute descent, the open supply tube 32 will allow fluid from the reservoir 31 to drain by gravity into the strut tubes and fill them. The shock strut is thus in readiness for operation as hereinbefore described when the object 1 reaches the ground, as shown in Figure 3.

By providing this collapsible shock strut, a higher descent velocity is permissible for a given maximum deceleration, as mentioned before. For example, with an object weight of around 600 pounds, a permissible velocity of 40 to 50 feet per second is obtained, for a maximum deceleration value of 20 g's, when using the shock strut in conjunction with a small nose spear. If the spear alone is used, the permissible descent velocity is only about 25 feet per second, thus requiring a larger parachute. It has been found that the saved parachute weight is approximately equal to the weight of the shock strut system, and therefore no weight penalty is involved, with a direct saving in volume represented by the difference in packed parachute volumes.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A shock absorber for a descending object comprising a hollow collapsible strut assembly for containing fluid and mounted in line ahead of said object, means defining two opposite lateral openings from the inside of said strut assembly to the outside, a wedge deflector fixed within said strut assembly, said deflector having a central crosswise edge and an outwardly directed side surface sloping back from each side of said edge, said side surfaces shaped and positioned to form a fluid ejection path through each of said openings which is substantially at a right angle to the axis of collapse of said strut assembly, and means for orienting said object with said shock absorber pointing downwardly.

2. Apparatus in accordance with claim 1 wherein one end of said strut assembly is attached to a main body of said object, and including a nose section fitted around said strut assembly and attached to the other end of said strut assembly, said nose section resting adjacent to said body when said strut assembly is collapsed, fluid container means in said object, pull-apart connecting means arranged to hold said nose section adjacent to said body under all but shock loads in the direction of separation, and strut filling means adapted to transfer fluid from said container means to said strut upon elongation of said strut assembly from its collapsed position.

3. Apparatus in accordance with claim 1 wherein said strut assembly includes means defining a central orifice of predetermined size to regulate the length of the collapsing time of said strut assembly under a compressive force, said orifice being positioned stationary with respect to said lateral openings.

4. Apparatus in accordance with claim 1 wherein said openings and said deflector are positioned near the aft end of said strut assembly next to said object, and including fluid container means in said object, and a fluid supply line connected to said container means and passing through said deflector along one side of said strut assembly substantially midway between said openings.

5. Apparatus in accordance with claim 4 including pull-apart connecting means arranged to hold said strut assembly in a collapsed position under all but shock loads in the direction of elongation, a shut-off valve in said fluid supply line, and valve opening means adapted to open said valve upon elongation of said strut assembly from said collapsed position.

6. An airborne component adapted to be returned to the ground in a substantially vertical direction, comprising a body, a hollow, normally collapsed, extendible shock strut mounted in line ahead of said body, a parachute attached to said body only and adapted to be opened during a fall of said component, said strut extending by inertia when said parachute is opened, fluid container means in said body, relatively small fluid passage means connecting said container means to the interior of said strut, and relatively large fluid exit means near the rear end of said strut through which fluid in said strut can pass when said component strikes the ground.

7. A shock absorber for a droppable object having a body, which comprises a plurality of concentric telescoping tubes having a fixed extended length, one end tube of said plurality being attached to said body with the center line of said tubes extending in a fore-and-aft direction ahead of said body, means closing the remote end of the other end tube, means defining a central orifice of predetermined size in said shock absorber near the aft end thereof to regulate the length of the collapsing time thereof under a compressive force, fluid container means in said object, means connecting said fluid container means to the aft side of said orifice for fluid transfer therebetween, pull-apart connecting means arranged to hold said tubes in a collapsed position under all but shock loads in the direction of elongation, a shut-off valve in said connection means, valve opening means adapted to open said valve upon elongation of said tubes from said collapsed position, and means for orienting said object with said shock absorber pointing downwardly.

References Cited in the file of this patent

UNITED STATES PATENTS

| | | |
|---|---|---|
| 1,802,649 | Heinkel | Apr. 28, 1931 |
| 2,306,321 | Roberts | Dec. 22, 1942 |
| 2,399,221 | Freas | Apr. 30, 1946 |
| 2,426,585 | Bean | Sept. 2, 1947 |
| 2,439,236 | Brown | Apr. 6, 1948 |
| 2,489,257 | Bean | Nov. 29, 1949 |
| 2,510,276 | Bickers | June 6, 1950 |